(12) United States Patent
Dierickx et al.

(10) Patent No.: US 7,951,355 B2
(45) Date of Patent: May 31, 2011

(54) PROCESS FOR PRODUCING A PURIFIED SYNTHESIS GAS STREAM

(75) Inventors: Jan Lodewijk Maria Dierickx, Amsterdam (NL); Maarten Hesselink, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 210 days.

(21) Appl. No.: 12/517,700

(22) PCT Filed: Dec. 6, 2007

(86) PCT No.: PCT/EP2007/063413
§ 371 (c)(1),
(2), (4) Date: Jun. 17, 2009

(87) PCT Pub. No.: WO2008/068305
PCT Pub. Date: Jun. 12, 2008

(65) Prior Publication Data
US 2010/0065782 A1 Mar. 18, 2010

(30) Foreign Application Priority Data
Dec. 8, 2006 (EP) .................................. 06125739

(51) Int. Cl.
*C01B 3/02* (2006.01)
*C01B 3/38* (2006.01)
(52) U.S. Cl. ............... 423/648.1; 423/220; 423/226; 423/237; 423/242.4
(58) Field of Classification Search .............. 423/648.1
See application file for complete search history.

(56) References Cited

U.S. PATENT DOCUMENTS

| 4,050,909 A | 9/1977 | Ranke ............................... 55/68 |
| 2004/0011990 A1 | 1/2004 | Dunaway et al. ................ 252/62 |
| 2004/0059054 A1 | 3/2004 | Lopez et al. .................. 525/54.3 |
| 2005/0038199 A1 | 2/2005 | Wang et al. ................. 525/329.4 |
| 2007/0259791 A1 | 11/2007 | Wang et al. .................... 507/261 |

FOREIGN PATENT DOCUMENTS

| AU | 698392 | 9/1995 |
| EP | 450861 | 10/1991 |
| EP | 510771 | 10/1992 |
| WO | WO9934917 | 7/1999 |
| WO | WO0176736 | 10/2001 |
| WO | WO0202489 | 1/2002 |
| WO | WO0207882 | 1/2002 |
| WO | WO2006008317 | 1/2006 |
| WO | WO2007082896 | 7/2007 |

OTHER PUBLICATIONS

Lurgi Oel, The Rectisol Process for Gas Purification, mg engineering, 1999, pp. 1-7.
Dry, Mark E. „Production of Hydrocarbons from Coal, 1957, Endeavour, New Series, vol. 8, No. 1, 1984, pp. 1-4.

*Primary Examiner* — Melvin C Mayes
*Assistant Examiner* — Kenneth Vaden
(74) *Attorney, Agent, or Firm* — Charles W. Stewart

(57) ABSTRACT

A process for producing a purified synthesis gas stream from a contaminated feed synthesis gas stream is disclosed. A part of the feed synthesis gas stream is subjected to a water gas shift step. The water gas shift step is used in combination with bulk contaminant removal followed by polishing to thereby remove the contaminants from the synthesis gas stream so as to provide the purified synthesis gas stream having a desired low level of contaminants.

14 Claims, 1 Drawing Sheet

US 7,951,355 B2

PROCESS FOR PRODUCING A PURIFIED SYNTHESIS GAS STREAM

Figure 1:
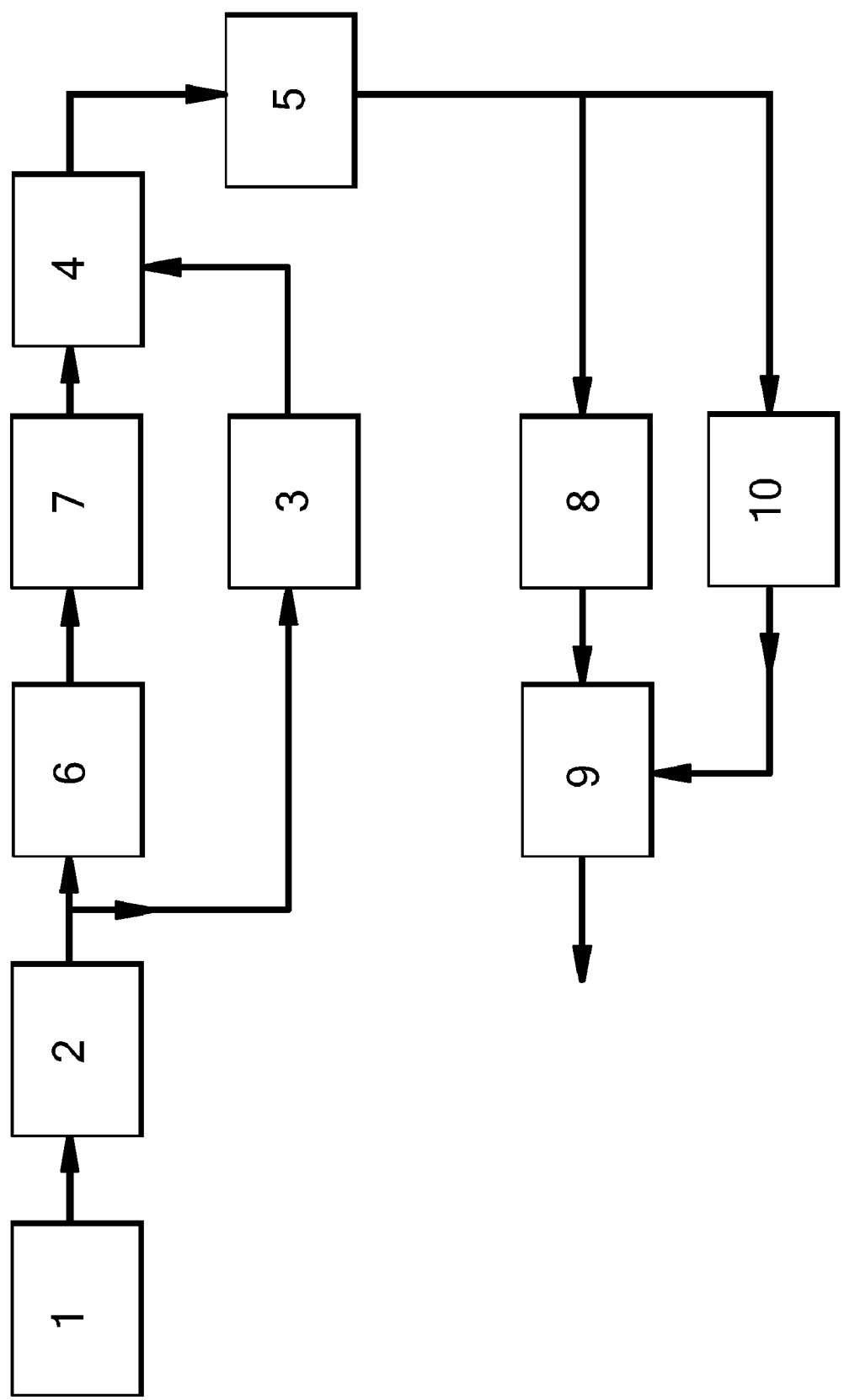

The present application claims priority from European Patent Application 06125739.0 filed 8 Dec. 2006.

The present invention relates to a process for producing a purified synthesis gas stream from a feed synthesis gas stream comprising contaminants.

Synthesis gas streams are gaseous streams mainly comprising carbon monoxide and hydrogen. Synthesis gas streams are generally produced via partial oxidation or steam reforming of hydrocarbons including natural gas, coal bed methane, distillate oils and residual oil, and by gasification of solid fossil fuels such as coal or coke. Reference is made to Maarten van der Burgt et al., in "The Shell Middle Distillate Synthesis Process, Petroleum Review April 1990 pp. 204-209" for a general description on the preparation of synthesis gas.

Apart from coal and heavy oil residues, there are many solid or very heavy (viscous) fossil fuels which may be used as feedstock for generating synthesis gas, including solid fuels such as anthracite, brown coal, bituminous coal, sub-bituminous coal, lignite, petroleum coke, peat and the like, and heavy residues, e.g. hydrocarbons extracted from tar sands, residues from refineries such as residual oil fractions boiling above 360° C., directly derived from crude oil, or from oil conversion processes such as thermal cracking, catalytic cracking, hydrocracking etc. All such types of fuels have different proportions of carbon and hydrogen, as well as different substances regarded as contaminants.

Depending on the feedstock used to generate synthesis gas, the synthesis gas will contain contaminants such as carbon dioxide, hydrogen sulphide, carbonyl sulphide and carbonyl disulphide while also nitrogen, nitrogen-containing components (e.g. HCN and $NH_3$), metals, metal carbonyls (especially nickel carbonyl and iron carbonyl), steam and in some cases mercaptans may be present.

Because synthesis gas is generally further processed in catalytic conversion reactions, removal of these contaminants to low levels is often desired. An especially interesting catalytic conversion reaction is a hydrocarbon synthesis process. In a hydrocarbon synthesis process, synthesis gas is catalytically converted into hydrocarbon compounds ranging from methane to high molecular weight molecules comprising up to 200 carbon atoms, or, under particular circumstances, even more. An example of a hydrocarbon synthesis process is the Fischer-Tropsch process, described in e.g. WO 02/02489, WO 01/76736, WO 02/07882, EP 510771 and EP 450861. Especially suitable catalysts are catalysts comprising cobalt, as these types of catalysts enable a higher yield in heavier hydrocarbons. Cobalt-based Fischer-Tropsch catalysts are highly sensitive to poisoning by contaminants, requiring purified synthesis gas streams with contaminant concentrations as low as in the ppbv range.

Processes for producing a purified synthesis gas stream from a feed synthesis gas stream comprising contaminants are known in the art. For example, in U.S. Pat. No. 4,050,909 a synthesis gas purification process is described using cold methanol. This process enables removal of hydrogen sulphide and carbon dioxide, but the concentrations of these contaminants in the purified synthesis gas are still in the ppmv range. For applications where the synthesis gas is to be catalytically converted, especially when using a cobalt-based catalyst, contaminant concentrations in the ppmv range are still too high. Purifying the synthesis gas streams to a higher degree using a methanol-based process would be uneconomical due to the disproportionately large amounts of energy required to regenerate the methanol.

It is an object of the present invention to provide an optimised process for purification of a synthesis gas stream derived from a range of carbonaceous fuels, such that the purified synthesis gas is suitable for hydrocarbon synthesis processes such as the Fischer-Tropsch process.

In the case that the synthesis gas is derived via gasification of solid carbonaceous fuels such as coal, the hydrogen/carbon monoxide ($H_2$/CO) ratio in the synthesis gas formed will generally be less than 1 due to the proportion of carbon and hydrogen in solid carbonaceous fuels. Fischer-Tropsch processes based on cobalt-catalysts generally desire an $H_2$/CO ratio in the synthesis gas in the range of from 1.5 to 2.0, frequently 1.6-1.8. Synthesis gas streams having a higher $H_2$/CO ratio are also desired for other parts or sections of a Fischer-Tropsch plant: some parts may desire a substantially pure hydrogen stream, that is, a very high $H_2$/CO ratio.

It is an additional object of the present invention to provide a process for purification of a synthesis gas stream resulting in an increase in the $H_2$/CO ratio in the purified synthesis gas.

It has now been found that these objects can be achieved by subjecting part of a feed synthesis gas stream comprising contaminants to a water gas shift and using a combination of bulk contaminants removal followed by polishing to remove contaminants to the desired low levels.

Therefore, the invention provides a process for producing a purified synthesis gas stream from a feed synthesis gas stream comprising hydrogen sulphide, carbonyl sulphide, carbon dioxide, hydrogen cyanide and ammonia besides the main constituents carbon monoxide and hydrogen, the process comprising the steps of:

(a) contacting one part of the feed synthesis gas stream with methanol at low temperature and at elevated pressure to remove hydrogen sulphide, carbonyl sulphide, carbon dioxide, hydrogen cyanide and ammonia, thereby obtaining methanol enriched in these compounds and a synthesis gas stream depleted in these compounds;

(b) contacting another part of the feed synthesis gas stream with a water gas shift catalyst in the presence of water to react at least part of the carbon monoxide with water, thereby obtaining a shifted synthesis gas stream enriched in hydrogen and in carbon dioxide;

(c) contacting the shifted synthesis gas stream with methanol at low temperature and at elevated pressure to remove carbon dioxide, hydrogen sulphide, carbonyl sulphide and ammonia, thereby obtaining solvent enriched in these compounds and a gas stream mainly comprising hydrogen and depleted in carbon dioxide;

(d) contacting the synthesis gas stream obtained in step (a) and optionally the gas stream obtained in step (c) with a first solid adsorbent comprising sulphur-impregnated activated carbon and/or activated carbon to remove metals and/or metal carbonyl compounds to obtain a synthesis gas stream depleted in metals and/or metal carbonyl compounds;

(e) contacting the synthesis gas stream depleted in metals and/or metal carbonyl compounds in the presence of water with a second solid adsorbent comprising one or more metals or oxides of the metals or combinations thereof, wherein the metals are selected from the group of Ag, Sn, Mo, Fe and Zn at elevated temperature to obtain the purified synthesis gas stream.

FIG. 1 presents a block diagram of a process for the synthesis of hydrocarbons from coal which includes certain aspects of the inventive process.

The process of the present invention enables removal of a wide range of contaminants including hydrogen sulphide, carbonyl sulphide, carbon dioxide, hydrogen cyanide, ammonia, metals and/or metal carbonyls to low levels. The purified synthesis gas, because of its low level of contaminants, is suitable for use in catalytic processes, even in a Fischer-Tropsch process where a cobalt-based catalyst is used.

Because contaminant removal takes place using several steps, the conditions of each step can be adjusted and optimised independently of the other steps to take into account the composition of the feed synthesis gas stream. Furthermore, the overall process is more economical because it combines bulk contaminant removal (using methanol) with polishing steps (using guard beds) to remove contaminants to the desired low levels.

The process of the present invention provides a synthesis gas stream with a $H_2/CO$ ratio more suitable for efficient hydrocarbon synthesis, such as in a Fischer-Tropsch process, as well as being able to accommodate variation in the $H_2/CO$ ratio of synthesis gas formed from different qualities of feedstock fuels. Because only part of the feed synthesis gas stream is subjected to a shift reaction, a smaller shift unit is needed, while the purified synthesis gas stream still has the desired $H_2/CO$ ratio.

It will be understood that the amount and type of contaminants in the feed synthesis gas stream can vary and depends on the amount of these contaminants present in the feedstock used to generate the feed synthesis gas stream.

Generally, the feed synthesis gas stream is obtained by gasification or reforming or autothermal reforming of feedstock.

When using solid fossil fuels such as coal as feedstock, generally the amount of $H_2S$ and COS in the synthesis gas stream leaving the gasifier is below 15 volume %, typically below 5 volume % based on the synthesis gas stream. In some cases the total amount of $H_2S$ and COS in the synthesis gas stream leaving the gasifier is in the range of from 5 to 15 ppmv, based on the synthesis gas stream, preferably from 8 to 12 ppmv based on the synthesis gas stream.

When using an oil residue as feedstock, generally the amount of $H_2S$ and COS in the synthesis gas stream leaving the gasifier will be below 20 volume %, typically below 10 volume % based on the synthesis gas stream. In some cases the total amount of $H_2S$ and COS in the feed synthesis gas stream leaving the gasifier is in the range of from 15 to 30 ppmv, preferably from 20 to 28 ppmv based on the synthesis gas stream.

The synthesis gas stream generated from a feedstock may comprise particulate matter, for example soot particles. Therefore, in a preferred embodiment synthesis gas exiting a synthesis gas generation unit is contacted with scrubbing liquid in a soot scrubber to remove particulate matter, in particular soot, thereby obtaining the feed synthesis gas stream. The synthesis gas stream exiting the synthesis gas generating unit is generally at elevated temperature and/or elevated pressure. Especially in the event that the synthesis gas is generated in a gasifier, the synthesis gas stream exiting the gasifier will be at elevated temperature and at elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 40 to 160° C., more preferably from 110 to 150° C. Preferably, the pressure at which the synthesis gas stream is contacted with scrubbing liquid is in the range of from 20 to 80 bara, more preferably from 20 to 60 bara.

The amount of COS in the feed synthesis gas stream depends on the composition of the feedstock from which the synthesis gas is derived and the technology applied for the production of synthesis gas. Generally, the amount of COS in a feed synthesis gas stream derived from solid fossil fuel feedstocks, especially coal, is from about 100 to 1000 ppmv, based on the feed synthesis gas stream.

The ratio between $H_2S$ and COS in the feed synthesis gas is set by the equilibrium between COS and $H_2S$ at the conditions prevailing in the feed synthesis gas generating unit. The process according to the invention is especially suitable for feed synthesis gas streams having an $H_2S$:COS ratio in the range from 20:1 to 10:1.

In addition to $H_2S$ occurring in the feed synthesis gas stream as a result from the feedstock, $H_2S$ can also be present because it has been added to prevent or suppress metal dusting. Metal dusting corrosion involves disintegration of metals and alloys into small particles of metal, metal carbides, metal oxides and carbon. It is believed that the transfer of carbon from the gas phase to the metal or alloy plays a key part in metal dusting. Carbon monoxide is the predominant cause of metal dusting, but hydrocarbons can also lead to metal dusting. For kinetic reasons metal dusting only proceeds significantly at a temperature of above a certain level, typically 300° C. The presence of $H_2S$ in a carbon monoxide containing gas can suppress metal dusting. The $H_2S$ source may be for example a gas containing $H_2S$ or another sulphur compound, which at the process conditions will decompose into $H_2S$, for example dimethyldisulphide. Thus, in a specific embodiment the feed synthesis gas stream is obtained by adding $H_2S$ or an $H_2S$ source to a synthesis gas stream to prevent metal dusting.

In the step (a), one part of the feed synthesis gas stream is contacted with methanol at low temperatures and at elevated pressure. Especially carbon dioxide and hydrogen sulphide are highly soluble under pressure in methanol, and readily releasable from solution when the pressure is reduced. Preferably, step (a) is performed at a temperature in the range of from −50 to 0° C., more preferably from −40 to −20° C. At these preferred temperatures, the solubility of contaminants such as $H_2S$ and $CO_2$ is higher. Preferably, step (a) is performed at a pressure in the range of from 20 to 80 bara, more preferably from 30 to 80 bara. At these preferred pressures, the solubility of contaminants such as $H_2S$ and $CO_2$ is higher.

It is preferred to remove at least 80%, preferably at least 90%, more preferably at least 95% and most preferably at least 99% of the carbon dioxide. Removal of carbon dioxide avoids the build-up of inerts when using the purified synthesis gas stream in a catalytic process, especially a Fischer-Tropsch process which includes a recycle.

Step (a) is preferably carried out by contacting the feed synthesis gas stream in counter-current upward flow with methanol. Step (a) is preferably carried out in a continuous mode, in which methanol enriched with contaminants is regenerated. This regeneration process is well known to the person skilled in the art. Methanol is suitably regenerated by pressure release (e.g. a flashing operation) and/or temperature increase (e.g. a distillation process). The regeneration is suitably carried out in two or more steps, preferably 3-10 steps, especially a combination of one or more flashing steps and a distillation step. When using refrigerated methanol, sulphur levels of 0.1 ppmv can be achieved.

Preferably, the conditions in step (a) are adjusted such that the synthesis gas stream obtained in step (a) comprises an amount of $H_2S$ and COS of up to 10 ppmv, preferably up to 5 ppmv. More preferably, the amount of $H_2S$ in the synthesis gas stream obtained in step (a) is up to 500 ppbv $H_2S$, still more preferably up to 300 ppbv $H_2S$ and most preferably up to 100 ppbv $H_2S$, based on the total feed synthesis gas stream. By adjusting the conditions in step (a) such that a large part but not all of the contaminants are removed, a smaller amount of methanol, and thus less refrigerating capacity, is needed in step (a). Furthermore, a smaller amount of methanol needs to be regenerated after contaminant removal, thus requiring less heat for the regeneration process.

In step (a), hydrogen cyanide (HCN) is also removed from the feed synthesis gas stream. HCN can poison catalysts, especially hydrocarbon synthesis catalysts, even when present only in trace amounts. HCN is difficult to remove from synthesis gas because of its low solubility in common solvents and because it is usually present in low concentration, typically below 100 ppmv, making removal by solid adsorption difficult. Removal of HCN through alkaline scrubbing is hampered by the presence of other acidic compounds. It will be understood that the amount of HCN in the feed synthesis gas stream can vary, depending on the feedstock used to generate the feed synthesis gas stream. Generally, the amount of HCN in the feed synthesis gas stream is in the range of from 20 ppbv to 100 ppmv. The amount of HCN in the purified synthesis gas stream is preferably less than 10 ppbv, typically in the range of from 3 ppbv to 15 ppbv, preferably from 3 ppbv to 10 ppbv. It is believed that HCN is converted to $NH_3$.

In step (b), part of the feed synthesis gas stream is contacted with a water gas shift catalyst to react at least part of the carbon monoxide with water. The water shift conversion reaction is well known in the art. Generally, water, usually in the form of steam, is mixed with the part of the feed synthesis gas stream to form carbon dioxide and hydrogen. The catalyst used can be any of the known catalysts for such a reaction, including iron, chromium, copper and zinc. Copper on zinc oxide is a known shift catalyst. A very suitable source for the water required in the shift reaction is the product water produced in a Fischer-Tropsch reaction (vide infra). Preferably this is the main source, e.g. at least 80% is derived from the Fischer-Tropsch process, preferably at least 90%, more preferably 100%. Thus the need of an external water source is minimised. In step (b), carbon monoxide is converted to carbon dioxide and thus, the $H_2/CO$ ratio is increased. The $H_2/CO$ ratio in synthesis gas formed by gasification of most types of carbonaceous fuels is generally about or less than 1, and is commonly about 0.3-0.6 for coal-derived synthesis gas, and 0.5-0.9 for heavy residue-derived synthesis gas. It is possible to use such an $H_2/CO$ ratio in a Fischer-Tropsch process, but more satisfactory results can be achieved by increasing the $H_2/CO$ ratio. The shifted gas stream obtained in step (b) is enriched, often highly enriched, in hydrogen and in carbon dioxide. The shifted gas stream obtained in step (b) suitably has an $H_2/CO$ ratio above 3, preferably above 5, more preferably above 7, still more preferably above 15 and possibly 20 or even above.

An additional reaction, taking place in step (b), is the conversion of hydrogen cyanide to ammonia. Thus, the shifted gas stream obtained in step (b) will be depleted in hydrogen cyanide.

The present invention allows for the division of the feed synthesis gas stream into any number of streams, more than one of which could undergo a catalytic water shift conversion reaction. In the simplest arrangement, as set out in claim 1, the feed synthesis gas stream is divided into two sub-streams, one of which undergoes the conversion reaction. It is preferred that the shifted synthesis gas stream is eventually combined with the non-shifted synthesis gas stream to form a synthesis gas stream having an increased $H_2/CO$ ratio of between 1.1 and 1.95. This combination can take place prior to step (d) or prior to step (e) or after step (e).

It will be understood that the invention includes embodiments wherein the feed synthesis gas stream is divided into several sub-streams such so as to create any desired $H_2/CO$ ratio following their recombination. Any degree or amount of division of the feed synthesis gas stream is possible. Where the feed synthesis gas stream is divided into two sub-streams, the division into the sub-streams is preferably in the range of 80:20 to 20:80 by volume, more preferably 70:30 to 30:70 by volume, depending upon the desired final $H_2/CO$ ratio. Simple analysis of the $H_2/CO$ ratios in the feed synthesis gas stream and knowledge of the desired ratio in the combined synthesis gas stream allows easy calculation of the division. In the case that one stream is to be used as feed for e.g. the second stage of a Fischer-Tropsch process, this stream will usually be between 10 and 50%, preferably between 20 and 35% of the stream which is catalytically shifted. In that case there are three streams, the two main streams in the range 80:20 to 20:80 by volume and one stream 10 to 50% of one of the earlier two streams.

The simple ability to change the degree of division of the feed synthesis gas stream into the sub-streams also provides a simple but effective means of accommodating variation in the $H_2/CO$ ratio in the feed synthesis gas stream, primarily due to variation in feedstock quality, i.e. the hydrogen and carbon content of the original fuel, for example, the 'grade' of coal. Certain grades of coal generally have a higher carbon content, but a high carbon content will, after gasification of the coal, provide a greater production of carbon monoxide, and thus a lower $H_2/CO$ ratio. However, using other grades of coal means removing more contaminants or unwanted parts of the coal, such as ash and sulphur and sulphur-based compounds. It is observed that it also possible to divide the feed synthesis gas stream into two streams, followed by a catalytic shift of one of the streams, followed by further division of the shifted stream, e.g. one for combining with the other stream, one for use as additional feed in a second stage of a Fischer-Tropsch process and one for the preparation of hydrogen.

The ability to change the degree of division of the feed synthesis gas stream into the sub-streams allows the present invention to be used with a variety of fuel feedstocks, generally 'raw' coal, without any significant re-engineering of the process or equipment to accommodate expected or unexpected variation in such coals. Thus, the present invention provides a method of increasing the hydrogen/carbon monoxide ($H_2/CO$) ratio in a synthesis gas stream derived from a solid carbonaceous fuel including coal, brown coal, peat, and heavy residual oil fractions, preferably coal.

In step (c) the shifted synthesis gas stream is contacted with methanol at low temperature and at elevated pressure to remove carbon dioxide, hydrogen sulphide, carbonyl sulphide and ammonia. The same conditions may be used as described hereinbefore for step (a). However, as the composition of the shifted synthesis gas stream is different from the feed synthesis gas stream used in step (a), the conditions in step (c) may be adjusted to enable an optimised contaminant removal. For example, in an especially preferred embodiment, step (c) is performed at a temperature range of from −70 to −20° C., preferably from −70 to −30° C. It has been found that at these preferred temperatures, the solubility of especially $CO_2$ is higher. In step (c) a gas stream mainly comprising hydrogen and depleted in carbon dioxide is obtained.

In step (d) the synthesis gas stream obtained in step (a) and optionally the gas stream obtained in step (c) is contacted with a first solid adsorbent comprising sulphur-impregnated activated carbon and/or activated carbon. In this step, metals and/or metal carbonyls are removed. In a preferred embodiment, the synthesis gas stream obtained in step (a) and the gas stream obtained in step (c) are combined and contacted with the same first solid adsorbent comprising sulphur-impregnated activated carbon and/or activated carbon. This allows for the use of the same adsorbent bed. Alternatively, the synthesis gas stream obtained in step (a) and the gas stream obtained in step (c) are contacted with separate beds comprising first solid adsorbent comprising sulphur-impregnated activated carbon and/or activated carbon. In the event that the feed synthesis gas stream comprises little metal and/or metal carbonyls, it suffices that only the synthesis gas stream obtained in step (a) is contacted with first solid adsorbent. In that case, it is preferred that the gas stream obtained in step (c) is combined with the synthesis gas stream depleted in metals and/or metal carbonyls obtained in step (d) or is added following step (e) to form the purified synthesis gas stream.

Suitably, step (d) is performed at a pressure in the range of from 1 to 80 bara, preferably from 15 to 70 bara, more preferably from 20 to 60 bara.

Suitably, step (d) is performed at relatively low temperature, preferably in the range of from 10 to 150° C., more preferably from 10 to 100° C., still more preferably from 20 to 50° C. At these preferred temperature ranges, the adsorption capacity of the sulphur-impregnated activated carbon and/or activated carbon is higher, especially for nickel carbonyl.

Step (d) results in first solid adsorbent enriched in metals and/or metal carbonyls and a synthesis gas stream depleted in metals and/or metal carbonyls.

In step (d) a synthesis gas stream depleted in metals and/or metal carbonyl compounds is obtained. Suitably, the synthesis gas stream obtained in step (d) comprises less than 1 ppmv of metal carbonyls, based on the total synthesis gas stream.

In step (e), the synthesis gas stream depleted in metals and/or in metal carbonyl compounds is contacted with a second solid adsorbent. The second solid adsorbent comprises one or more metals or oxides of metals or combinations thereof, the metals preferably being selected from the group of Ag, Sn, Mo, Fe and Zn. An especially preferred solid adsorbent is ZnO, because of its good performance. Another important advantage of ZnO is that the occurrence of unwanted side reactions such as water gas shift, hydrogenation of CO and $CO_2$ and methanol synthesis is much less.

It will be understood that preferably the second solid adsorbent does not comprise any components, which could act as a hydrocarbon synthesis catalyst. The formation hydrocarbons could lead to unwanted deposits of hydrocarbons on the solid adsorbent. Especially deposition of heavy hydrocarbons or waxy residues should be avoided. Known catalysts for the preparation of hydrocarbons are catalysts comprising metals or compounds selected from group VIII of the Periodic Table of the Elements. References to the Periodic Table and groups thereof used herein refer to the previous IUPAC version of the Periodic Table of Elements such as that described in the 68th Edition of the Handbook of Chemistry and Physics (CPC Press). Therefore, in a preferred embodiment the second solid adsorbent is substantially free of metals or compounds comprising metals from group VIII of the Periodic Table of the Elements, meaning that the amount of metals or compounds comprising metals from group VIII of the Periodic Table of the Elements is less than 100 ppmw, preferably less than 10 ppmw based on the total solid adsorbent. In particular, preferably the second solid adsorbent is substantially free of metals selected from the group of nickel, cobalt and ruthenium.

It will also be understood that it is preferred that the second solid adsorbent does not comprise any components, which could act as methanation catalysts. Methanation, the hydrogenation of carbon monoxide and/or carbon dioxide to methane, is a highly exothermic reaction and therefore needs to be avoided. A well-known methanation catalyst is nickel. Therefore, in a preferred embodiment the solid adsorbent is substantially free of nickel, meaning that the amount of nickel is less than 100 ppmw, preferably less than 10 ppmw, based on the total solid adsorbent.

The second solid adsorbent can be used in any suitable form known in the art, which allows contacting the synthesis gas stream with the solid adsorbent. It is preferred to provide the solid adsorbent in a form, which is easy to handle, in particular in loading and unloading the solid adsorbent from a suitable reactor, position or site. Pressing the solid adsorbent provides one suitable form of the material. One pressed form includes tablets, which tablets are then relatively easily loadable and unloadable from a reaction vessel through which the gas stream can pass. However, a disadvantage of using a pressed form is that the surface available for contact with the feed synthesis gas stream is relatively low. Thus, it is preferred that the second solid adsorbent is supported on support material, especially an inorganic support material in order to, for example, increase the surface area, pore volume and pore diameter. Preferably, support material selected from the group of alumina, silica, titania, zirconia, carbon, silicon carbide and kieselguhr is used. Either one type of support materials can be used or mixtures of different the support materials can be used.

In a preferred embodiment, the second solid adsorbent comprises alumina. It has been found that the presence of alumina results in an even better removal of COS. Preferably, the amount of alumina present in the solid adsorbent is in the range of from 0.1 to 5 wt %, more preferably from 0.1 to 3 wt %, based on total solid adsorbent.

Step (e) is performed at elevated temperature. Preferably, step (e) is performed at a temperature in the range of from 100 to 240° C., more preferably from 140° C. to 200° C. It has been found that at the preferred temperatures, removal of both $H_2S$ and COS to low levels, even in the ppbv range, can be achieved.

Step (e) is performed at a pressure in the range of from 1 to 100 bara, preferably from 20 to 80 bara, more preferably from 40 to 60 bara. By performing step (e) at elevated pressure, the purified synthesis gas stream will be at elevated pressure and can be further processed in a reaction which requires elevated pressure.

Without wishing to be bound by any theory for the removal of COS, it is believed that removal of COS takes place according to:

$$COS + H_2O \leftrightarrow H_2S + CO_2$$

To facilitate removal of COS, step (e) is carried out in the presence of water. The water is preferably present in the amount of up to 1% volume, more preferably in the amount of approximately 0.2% v/v, based on the total synthesis gas stream in step (e).

It will be understood that the concentrations of all four species, COS, $H_2O$, $H_2S$ and $CO_2$, influence the thermodynamic equilibrium of COS removal. The amount of $H_2S$ at thermodynamic equilibrium with COS, at a COS concentration at the end of the COS hydrolysis of 1 ppbv, at a given temperature and at given concentrations of $H_2O$ and $CO_2$ is referred to as $[H_2S]$ equilibrium.

The process according to the invention involving removal of COS and of $H_2S$, is especially suitable for purifying synthesis gas streams wherein the total concentration of $H_2S$ and COS does not exceed $[H_2S]$ equilibrium. A removal of COS to a level of 2 ppbv can then be achieved at a GHSV of between 100 and 1000 m³/m³/h, especially about 400 m³/m³/h.

The gas space velocity may be similar to current processes, for example in the range 1,000-100,000/h, preferably approximately 10-20,000/h.

The synthesis gas stream may be contacted with second solid adsorbent either once or a plurality of times, preferably in a serial manner using more than one guard bed comprising second solid adsorbent, so as to continue to reduce the COS content. Using the same material in more than one cleaning or guard bed provides additional advantages. If one guard bed fails, there is immediate 'back up' to maintain guard of the catalyst material, which material is generally much more expensive than guard bed material. This back up helps in terms of safety as well as catalyst preserver. It also allows a guard bed to be off-line for other reasons, such as reloading, regeneration, cleaning, servicing or emergencies, whilst the other(s) guard bed is maintained and the overall catalytic process continues. Using individual guard bed materials for different impurities requires the catalytic process to stop every time any guard bed material or guard bed unit must be off-line or malfunctions.

The present invention provides an optimised and effective process for the removal of a wide range of contaminants including $H_2S$, COS, HCN and metals and metal carbonyls from a synthesis gas stream. Bulk contaminant removal of a wide range of contaminants is done in a relatively small refrigerated methanol unit, followed by further removal of contaminants in a series of guard beds. In addition, the $H_2/CO$ ratio in the purified synthesis gas stream is favourable enough to make the synthesis gas stream suitable for use in a hydrocarbon synthesis process, especially in a Fischer-Tropsch process.

The purified synthesis gas stream comprises predominantly hydrogen and carbon monoxide and very low levels, in the ppbv range, of $H_2S$, COS and HCN.

Typically, the amount of $H_2S$ in the purified synthesis gas stream is 10 ppbv or less, preferably 5 ppbv or less, more preferably 1 ppbv, based on the purified synthesis. The process according to the invention typically results in a purified synthesis gas stream having an amount of COS of 10 ppbv or less. In most cases the amount of COS in the purified synthesis gas stream is 5 ppbv or less, or even 1 ppbv or less, based on the purified synthesis gas stream.

Because of these low concentrations of contaminants, the purified synthesis gas stream is especially suitable for use in a Fischer-Tropsch hydrocarbon synthesis step.

Thus, in a preferred embodiment, the purified synthesis gas stream is contacted with a suitable hydrocarbon synthesis catalyst to form normally liquid hydrocarbons in a hydrocarbon synthesis reaction, in particular in Fischer-Tropsch reactions or processes. Catalysts for use in the Fischer Tropsch reaction frequently comprise, as the catalytically active component, a metal from Group VIII of the Periodic Table of Elements. Particular catalytically active metals include ruthenium, iron, cobalt and nickel. Cobalt is a preferred catalytically active metal.

The Fischer-Tropsch catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

The amount of Fischer-Tropsch catalytically active metal on the carrier is preferably in the range of from 3 to 300 ppbw per 100 ppbw of carrier material, more preferably from 10 to 80 ppbw, especially from 20 to 60 ppbw. The Fischer-Tropsch catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

Reference to "Groups" and the "Periodic Table" as used herein relate to the "previous IUPAC form" of the Periodic Table such as that described in the 68th edition of the Handbook of Chemistry and Physics (CRC Press).

A most suitable Fischer-Tropsch catalyst comprises cobalt as the catalytically active metal and zirconium as a promoter. Another most suitable catalyst comprises cobalt as the catalytically active metal and manganese and/or vanadium as a promoter.

The promoter, if present in the Fischer-Tropsch catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

The Fischer-Tropsch catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C. Other processes for the preparation of Fischer-Tropsch catalysts comprise kneading/mulling, often followed by extrusion, drying/calcination and activation.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

It is an advantage of the process according to the invention that step (e) can be performed in similar temperature ranges as the Fischer-Tropsch process. This enables a more efficient overall process, as the temperature fluctuations in the overall process are smaller. This reduces the need for cooling and subsequent heating in between the different process steps.

Typical total pressures for the Fischer-Tropsch catalytic conversion process are in the range of from 1 to 200 bar absolute, more preferably from 10 to 70 bar absolute. In the catalytic conversion process especially more than 75 wt % of $C_5^+$, preferably more than 85 wt % $C_5^+$ hydrocarbons are formed. Depending on the catalyst and the conversion conditions, the amount of heavy wax ($C_{20}^+$) may be up to 60 wt %, sometimes up to 70 wt %, and sometimes even up till 85 wt %. Preferably a cobalt catalyst is used and a low temperature is used (190-230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955.

Preferably, a Fischer-Tropsch catalyst is used, which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch synthesis may be carried out in a slurry phase regime or an ebullating bed regime, wherein the catalyst particles are kept in suspension by an upward superficial gas and/or liquid velocity.

It will be understood that the skilled person is capable to select the most appropriate conditions for a specific reactor configuration and reaction regime.

In a more preferred embodiment a fixed bed Fischer-Tropsch process is used, especially a multi-tubular fixed bed. Such a multi-tubular fixed bed reactor usually comprises a normally substantially vertically extending vessel, a plurality of open-ended reactor tubes arranged in the vessel parallel to its central longitudinal axis of which the upper ends are fixed to an upper tube plate and in fluid communication with a fluid inlet chamber above the upper tube plate and of which the lower ends are fixed to a lower tube plate and in fluid communication with an effluent collecting chamber below the lower tube plate, optionally liquid supply means for supplying liquid to the fluid inlet chamber, gas supply means for supplying gas to the fluid inlet chamber, and an effluent outlet arranged in the effluent collecting chamber.

The upper ends of the reactor tubes are provided with tubes extending through the upper tube plate and/or through the bottom of a horizontal tray arranged above the upper tube plate.

During normal operation the reactor tubes are filled with catalyst particles. To convert for example synthesis gas into hydrocarbons, synthesis gas is supplied through the fluid inlet chamber into the upper ends of the reactor tubes and passed through the reactor tubes. Effluents leaving the lower ends of the reactor tubes are collected in the effluent collecting chamber and removed from the effluent collecting chamber through the effluent outlet.

The invention also provides the products obtained in the Fischer-Tropsch reaction, including distillates and hydroconverted products, e.g. fuels such as naphtha, kero and diesel, base oils and n-paraffins, light detergent feedstocks and wax.

In a preferred embodiment, a portion of the shifted synthesis gas stream, optionally after removal of contaminants, is used for hydrogen manufacture, such as in a Pressure Swing Adsorption (PSA) step. The proportion of the shifted synthesis gas stream used for hydrogen manufacture will generally be less than 10% by volume, preferably approximately 1-7% by volume. The hydrogen manufactured in this way can then be used as the hydrogen source in hydrocracking of the products of the hydrocarbon synthesis reaction. This arrangement reduces or even eliminates the need for a separate source of hydrogen, e.g. from an external supply, which is otherwise commonly used where available. Thus, the carbonaceous fuel feedstock is able to provide a further reactant required in the overall process of coal to liquid products conversion, increasing the self-sufficiency of the overall process.

Without wishing to be restricted to a particular embodiment, the invention will now be described in further detail with reference to FIG. 1. In FIG. 1, there is shown a process for the synthesis of hydrocarbons from coal. This starts with the gasification of coal with oxygen in a gasification unit (1) to form a synthesis gas stream, followed by removal of solids such as slag, soot and the like in a solids removal unit (2). The resulting feed synthesis gas stream is then divided into two streams. One forms a 'by-pass' stream, which passes through a $CO_2/H_2S/HCN/COS$ removal unit (3) using refrigerated methanol at elevated pressure. The resulting synthesis gas stream depleted in $CO_2/H_2S/HCN/COS$ is led to a first guard bed (4) comprising sulphur-impregnated activated carbon and/or activated carbon, where removal of metals and/or metal carbonyls takes place. The synthesis gas stream exiting this first guard bed is depleted in metals and/or metal carbonyls and enters a second guard bed (5), where further removal of $H_2S$, COS and HCN takes place. The other stream of synthesis gas passes into a sour shift unit (6) to undergo a catalytic water shift conversion reaction wherein the $H_2/CO$ ratio is significantly increased. The resulting shifted synthesis gas from the sour shift unit then undergoes the same or similar $CO_2/H_2S$ removal using refrigerated methanol at elevated pressure in unit 7. The resulting gas stream now mainly comprising hydrogen and depleted in carbon dioxide enters the first guard bed where removal of metals and/or metal carbonyls takes place and subsequently the gas stream depleted of metals and metal carbonyls enters the second guard bed, where further removal of $H_2S$, COS and optionally HCN to very low levels, in the ppbv range, takes place. The resulting purified synthesis gas stream exiting the second guard bed is used in a heavy paraffin synthesis process, which may involve one or more reactors or units (8) in one or more stages. The products provided by the HPS can then be converted in a manner known in the art to provide distillates, such as middle distillates in unit 9. FIG. 1 shows the possible use of a part of the shifted synthesis gas stream into a pressure swing adsorption unit (10), wherein the shifted synthesis gas is converted to provide a hydrogen-enriched stream, which stream can then be used in the hydrocracking in the product workup.

It will be understood that the shifted synthesis gas stream may also be re-combined with the non-shifted synthesis gas stream prior to their entry into the heavy paraffin synthesis process.

What is claimed is:

1. A process for producing a purified synthesis gas stream from a feed synthesis gas stream comprising hydrogen sulphide, carbonyl sulphide, carbon dioxide, hydrogen cyanide and ammonia besides the main constituents carbon monoxide and hydrogen, wherein the process comprises the steps of:
    (a) contacting one part of the feed synthesis gas stream with methanol at low temperature and at elevated pressure to remove hydrogen sulphide, carbonyl sulphide, carbon dioxide, hydrogen cyanide and ammonia, thereby obtaining methanol enriched in these compounds and a synthesis gas stream depleted in these compounds;
    (b) contacting another part of the feed synthesis gas stream with a water gas shift catalyst in the presence of water to react at least part of the carbon monoxide with water, thereby obtaining a shifted synthesis gas stream enriched in hydrogen and in carbon dioxide;
    (c) contacting the shifted synthesis gas stream with methanol at low temperature and at elevated pressure to remove carbon dioxide, hydrogen sulphide, carbonyl sulphide and ammonia, thereby obtaining solvent enriched in these compounds and a gas stream mainly comprising hydrogen and depleted in carbon dioxide;

(d) contacting the synthesis gas stream obtained in step (a) with a first solid adsorbent comprising sulphur-impregnated activated carbon and/or activated carbon to remove metals and/or metal carbonyl compounds to obtain a synthesis gas stream depleted in metals and/or metal carbonyl compounds; and (e) contacting the synthesis gas stream depleted in metals and/or metal carbonyl compounds in the presence of water with a second solid adsorbent comprising one or more metals or oxides of the metals or combinations thereof, wherein the metals are selected from the group of Ag, Sn, Mo, Fe and Zn at elevated temperature to obtain the purified synthesis gas stream.

2. A process according to claim 1, wherein step (e) is performed at a temperature in the range of from 100 to 240° C.

3. A process according to claim 1, wherein the second solid adsorbent comprises zinc oxide.

4. A process according to claim 1, wherein the second solid adsorbent further comprises alumina present in the range of from 0.1 to 5 wt %, based on total solid adsorbent.

5. A process according to claim 1, wherein the purified synthesis gas comprises less than 10 ppbv COS, based on the total purified synthesis gas stream.

6. A process according to claim 1, wherein the purified synthesis gas stream comprises less than 10 ppbv $H_2S$ based on the total purified synthesis gas stream.

7. A process according to claim 1, wherein the purified synthesis gas stream comprises less than 10 ppbv HCN.

8. A process according to claim 1, wherein in step (e) the amount of water is in the range of from 10 ppmv to 1% v/v, based on the total synthesis gas stream.

9. A process according to claim 1, wherein step (a) is performed at a temperature in the range of from −50 to 0° C.

10. A process according to claim 1, wherein step (c) is performed at a temperature in the range of from −70 to −20° C.

11. A process according to claim 1, wherein the feed synthesis gas stream is obtained by contacting synthesis gas exiting a synthesis gas generation unit with scrubbing liquid to remove particulate matter.

12. A process according to claim 1, wherein the feed synthesis gas stream is obtained by gasification of coal.

13. A process according to claim 1, wherein the purified synthesis gas stream is contacted with a hydrocarbon synthesis catalyst at a temperature in the range of 150 to 300° C. to produce hydrocarbons.

14. A process according to claim 1, further comprising: contacting the purified synthesis gas stream with a hydrocarbon synthesis catalyst comprising cobalt.

* * * * *